(12) United States Patent
Haff et al.

(10) Patent No.: US 9,075,982 B2
(45) Date of Patent: Jul. 7, 2015

(54) SECURITY ARRANGEMENT

(75) Inventors: Olle Haff, Umea (SE); Anders Markstedt, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 674 days.

(21) Appl. No.: 13/396,894

(22) Filed: Feb. 15, 2012

(65) Prior Publication Data

US 2012/0249450 A1 Oct. 4, 2012

Related U.S. Application Data

(60) Provisional application No. 61/471,219, filed on Apr. 4, 2011.

(30) Foreign Application Priority Data

Apr. 4, 2011 (EP) ..................................... 11160940

(51) Int. Cl.
G06F 3/041 (2006.01)
G06F 21/36 (2013.01)

(52) U.S. Cl.
CPC ..................................... G06F 21/36 (2013.01)

(58) Field of Classification Search
USPC ........................................ 345/173; 178/18.01
See application file for complete search history.

(56) References Cited

U.S. PATENT DOCUMENTS

| | | | |
|---|---|---|---|
| 8,683,390 B2* | 3/2014 | de los Reyes | 715/863 |
| 8,839,150 B2* | 9/2014 | King et al. | 715/836 |
| 2009/0313693 A1 | 12/2009 | Rogers | |
| 2009/0325691 A1* | 12/2009 | Loose | 463/30 |
| 2013/0120282 A1* | 5/2013 | Kukulski | 345/173 |

FOREIGN PATENT DOCUMENTS

EP 1 909 161 A1 4/2008

OTHER PUBLICATIONS

European Search Report, corresponding to EP 11 16 0940, date of completion of the search Jun. 23, 2011.

* cited by examiner

*Primary Examiner* — Abbas Abdulselam

(74) *Attorney, Agent, or Firm* — Renner, Otto, Boisselle & Skalr, LLP

(57) ABSTRACT

The present invention relates to a method and arrangement for providing access to a device, the method comprising: receiving via a touch surface information, at least partly comprising a graphical code, said code comprising at least two parts, a first part relating to a first physical value on said touch surface and a second part relating to a second physical value on said touch surface, and generating a graphical code based on said first and second physical values, said graphical code having at least one portion deviating from a plane extension of said touch surface.

15 Claims, 6 Drawing Sheets

SECURITY ARRANGEMENT

TECHNICAL FIELD

The present invention relates generally to an input mode authentication and more particularly, it relates to a simple user interaction with computing devices that can be used for device security lock/unlock controls.

BACKGROUND

More and more sensitive and private information is stored in computers and portable devices, such as PDAs and mobile phones. The information must be secured, e.g. using password, logging information etc.

Many devices employ touch screen technology. For example, a user may be able to enter data on a display by pressing displayed keys for entering password or making patterns for authentication.

While current systems do exist for entering a predetermined pattern for authentication purpose, these systems operate in two dimensions, which may reduce security options.

SUMMARY

Present invention provides an enhanced method and arrangement for authentication using a three dimensional authentication code.

For this reason the invention relates to a method of providing access to a device. The method comprises: receiving via a touch surface information, at least partly comprising a graphical code, the code comprising at least two parts, a first part relating to a first physical value on the touch surface and a second part relating to a second physical value on the touch surface, and generating a graphical code based on the first and second physical values, the graphical code having at least one portion deviating from a plane extension of the touch surface. The physical value is one or several of a pressure value on the touch surface or a distance value from the touch surface. Preferably, in one embodiment, the first physical value generates the graphical code in x and y directions on the touch surface and the second physical value extend the graphical code in a z-direction, wherein x, y and z directions are in Cartesian co-ordinates. The method may comprise generating a guiding image on the touch surface, illustrating the graph in a first or second level with respect to the first and second values. The guiding image changes characteristics with respect to the first and second physical values. The method may be carried out in a device or a network in communication with the device.

The invention also relates to device comprising: a processor, a touch surface connected to the processor. The touch surface is detects a physical quantity with respect to a pointing object and provide said processor with a signal relating to said physical quantity, wherein the processor is configured to receive said signal, detect if said physical quantity comprises a first or a second value, generating a graphical code based on said first and second signal, said graphical code having at least one portion deviating from a plane extension of said touch surface. According to one embodiment, the device comprises a pressure sensitive touch surface a pressure value on the touch surface and/or the device comprises a touch surface for measuring distance to an object. The first physical value generates the graphical code in x and y directions on the touch surface and the second physical value extends the graphical code in a z-direction, wherein x, y and z directions are in Cartesian co-ordinates. The device may comprise an interface unit for generating a guiding image on the touch surface, illustrating the graph in a first or second level with respect to the first and second values. The device may comprise an interface unit configured to change guiding image characteristics with respect to the first and second physical values. The device may be least one of a cellular telephone, personal data assistants (PDA's), palm-top computers, wireless electronic receivers and cellular telephone receivers, multimedia Internet enabled cellular telephones, and similar personal electronic devices.

The invention also relates to a computer program product for providing access to a device, comprising: instruction set for receiving via a touch surface information, at least partly comprising a graphical code, the code comprising at least two parts, a first part relating to a first physical value on the touch surface and a second part relating to a second physical value on the touch surface, and instruction set for generating a graphical code based on the first and second physical values, the graphical code having at least one portion deviating from a plane extension of the touch surface.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

As used herein, a "touchscreen" refers to a screen or portion of a screen which may be part of a touch input device with an associated image display having a "touch surface". A touch surface may be integral parts of an electronic device, such as a touch screen display, or a separate module which can be coupled to the electronic device by a wired or wireless data link.

As used herein, a "two dimensional code" refers to information inputted on a touchscreen in along x and y axis, i.e. surface plane of the touchscreen.

As used herein, a "three dimensional code" refers to information inputted on a touchscreen along z axis, i.e. in an angle deviating from surface plane of the touchscreen.

As used herein, the term "device" refers to at least one of a cellular telephone, personal data assistants (PDA's), palm-top computers, wireless electronic receivers and cellular telephone receivers, multimedia Internet enabled cellular telephones, and similar personal electronic devices which include a programmable processor, memory and a connected or integral touch surface. The present invention is applicable to any type of portable or non-portable electronic device having either an integral touch surface or a touch surface that is connectable to the electronic device, such as by a wired data link or a wireless data link. In the following described and illustrated embodiments, the device is a cellular telephone.

Figure 1:
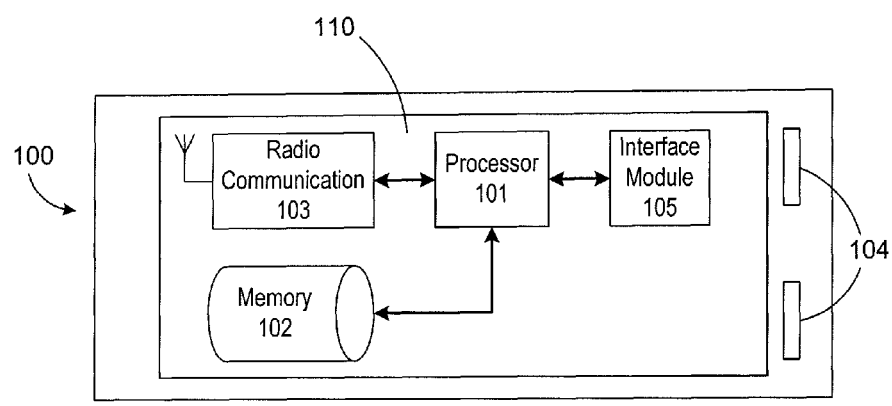
FIG. 1 illustrates schematically a mobile terminal according to one aspect of the present invention.

FIG. 1 illustrates one embodiment of the present invention incorporated in a mobile terminal such as a cell phone 100. FIG. 1 depicts typical components of the cell phone 100. The cell phone 100 may comprise a processor 101, a memory unit 102, a radio communications transceiver 103, control keys 104, interface module 105, an antenna 106 and a touch screen display 110. The touch screen display 110 can be any type of touch screen, such as a resistive-sensing touchscreen, capacitive-sensing touchscreen, infrared sensing touchscreen, acoustic/piezoelectric sensing touchscreen or the like. The various embodiments are not limited to any particular type of touch screen. The touchscreen 110 is configured to, besides detecting movements on the surface, also measure or sense pressure applied on to it or distance to a pointing object, e.g. a finger or stylus.

The processor 101 is configured to control various function of the device 100. Control software may be stored in the memory 102. The memory 102 may also store data related to different applications and functionality, such as authentication data.

The radio communication transceiver 103 controls radio communication between the cell phone and a communication network (not shown) using antenna 105.

The interface module 105 may be configured to handle inputs from the keys 104 and touch screen 110 and outputs to the display and various other parts, such as LEDs etc.

The control keys 104 may be configured to input commands, control functions, such as camera etc.

Normally, the device is provided with an option to allow the user to use graphical authentication, e.g. when starting the device or exiting sleep mode. A user may execute a graphical authentication code to be used as a template graphical authentication code on the touchscreen display 110 during a training session. The template graphical authentication code may be stored in the memory 102.

Figure 2:
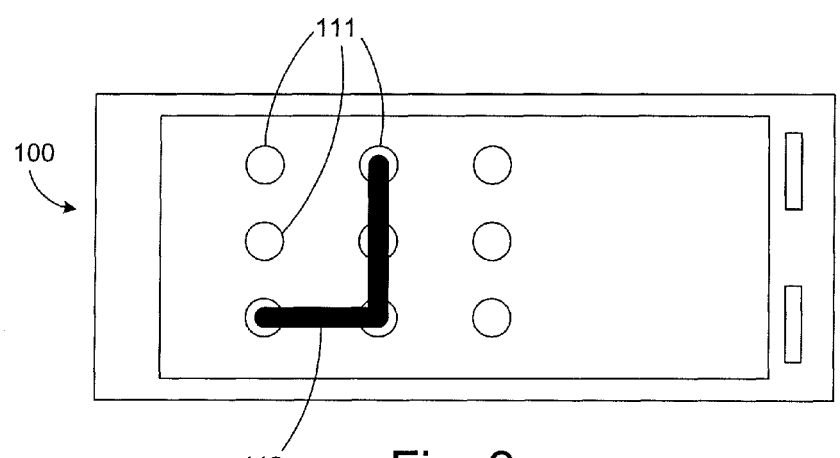
FIG. 2 illustrates schematically a display of a mobile terminal according to one aspect of the present invention with a two dimensional passcode.

Then, each time the user wants to access the device 100, the users provides the graphical authentication code via the touchscreen 110. FIG. 2 illustrates an exemplary two dimensional graphical authentication code. A number of dots 111, e.g. 9 dots, are displayed. The user may connect the dots 111 by moving a finger or a stylus over the dots and connect a number of them which will be interpreted as a graphical authentication code 112. The code 112 may be displayed or it may also be invisible.

The processor 101 compares the inputted graphical authentication code to the template graphical authentication code and associated data set stored in the memory 102 as described more fully below. A tolerance value may be used to accept small deviations.

According to the present invention, the authentication is enhanced using a three dimensional code entered using pressure sensing and measuring or distance detection on the touchscreen.

"Pressure sensing" as used herein implies an arrangement that measures pressure of a finger or a pointing device on the surface of the screen.

"Distance detection" as used herein implies an arrangement that measures a distance to a finger or a pointing device on adjacent to the surface of the screen.

Figure 3:
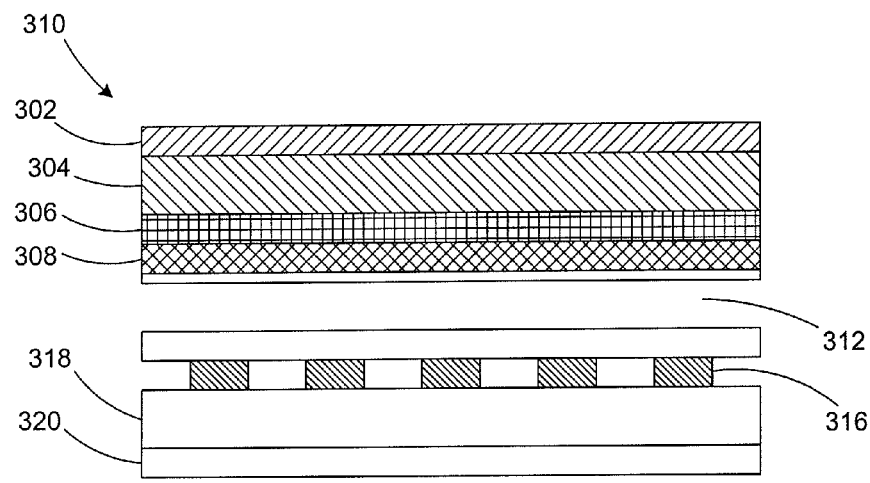
FIG. 3 illustrates schematically a cross sectional view through a touchscreen for measuring pressure according to one embodiment.

FIG. 3 is a cut through a part of one exemplary pressure sensitive touchscreen 310. The screen 310 may consist of a sandwich of liquid crystal 312 between a top glass substrate 304 and a bottom glass substrate 318 with polarizers 302, 320 on the external surfaces of the glass substrates 304, 318. On the internal surface of the top glass substrate 304 is a colour filter 306. A first layer of strips of transparent electrodes 308 is on the top glass substrate 304. A second layer of transparent electrodes 316 is attached on the internal surface of the bottom glass substrate 318, perpendicular to the first layer of electrodes 308. Therefore if the first layer of electrodes ran in a direction parallel to the width (commons) of the glass substrates 304, 318, then the second layer of electrodes 316 runs in a direction parallel to the length (segments) of the glass substrates 304, 318. Wherever a strip from the first layer of electrodes 308 crosses a second strip from the second layer of electrodes 316, a pixel element is formed.

The electrical model of a pixel is similar to a capacitor. The intersection of segments and commons of strip 308, 316 form capacitor plates and the liquid crystal 312 acts as the dielectric of a capacitor (C). Voltage V across this capacitor is equal to charge Q over capacitance C (V=Q/C), therefore, voltage is proportional to the distance between the plates. When a force is applied to the surface of the top glass, substrate 304, such as a press with a finger or stylus, the distance between the top and bottom glass substrates 304, 318 changes and thus the distance between the strip electrodes 308, 316 changes. When the distance between the electrodes changes, the capacitance of the pixel changes and the change in capacitance can be detected by the resulting change in voltage at that pixel. Because of the relationship between voltage and distance between the plates, as the electrodes get closer, the pixel voltage will decrease. Using the capacitance change of a pixel the location and amount of an applied force may be measured.

Figure 4:
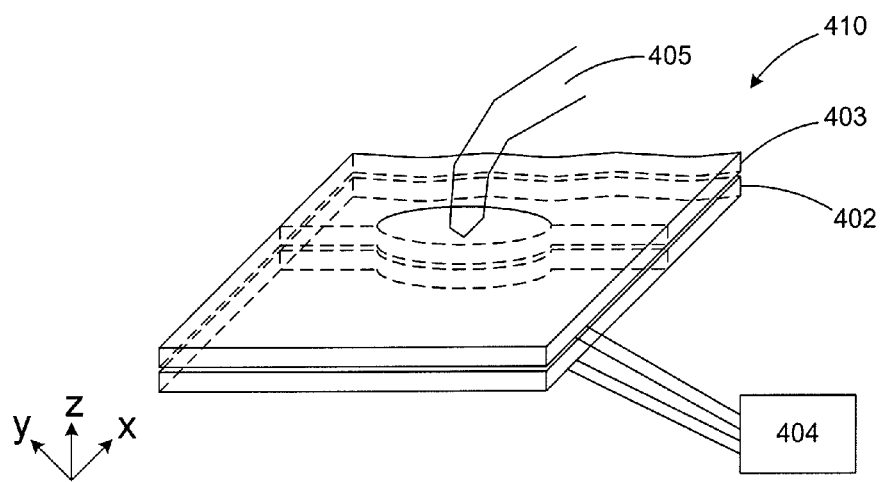
FIG. 4 illustrates schematically a perspectival view of a touchscreen for measuring pressure according to a second embodiment.

Another embodiment of a portion of a touchscreen 410 is shown in FIG. 4, which illustrates a touchscreen 410 for generating electrical signals indicating a positional property and an extent property of a mechanical interaction within a sensing zone. Touchscreen 410 comprises a plurality of conductive layers that comprises at least a first conductive layer 402 and a second conductive layer 403. At least one of the plurality of conductive layers is a pressure sensitive conductive layer, which may comprise a quantum tunnelling conductance (qtc) material. The touchscreen 410 is configured such that contact between conductive layers is allowed during the absence of a mechanical interaction within the sensing zone.

The plurality of conductive layers of the touchscreen is provided with an arrangement of electrical terminals (not shown). The electrical terminals may be arranged to provide the touchscreen with a three-terminal sensing arrangement, to allow a single positional value and an extent value of a mechanical interaction to be determined. In Cartesian co-ordinates, a three-terminal sensing arrangement allows a measurement in the X-axis or Y-axis direction, along with a measurement in the Z-axis direction. The electrical terminals may be arranged to provide the touchscreen with a four-terminal sensing arrangement, to allow first and second positional values and an extent value of a mechanical interaction to be determined. In Cartesian co-ordinates, a four-terminal sensing arrangement allows a measurement in the X-axis direction and the Y-axis direction, along with a measurement in the Z-axis direction.

The touchscreen 410 may be connected to the interface module 404 in electrical connection with the electrical terminals of the plurality of conductive layers. Touchscreen 410 is configured to respond to a mechanical actuator. In one embodiment, the touchscreen is configured to be responsive to actuation by a finger 405.

In some embodiments, a touch surface can be provided in areas of the electronic device 100 outside of the touchscreen 110. In yet further embodiments, the touch surface may be an external touchpad that can be connected to the cell phone 100 (or other computational device) by means of a cable to a cable connector or a wireless transceiver.

Figure 5:
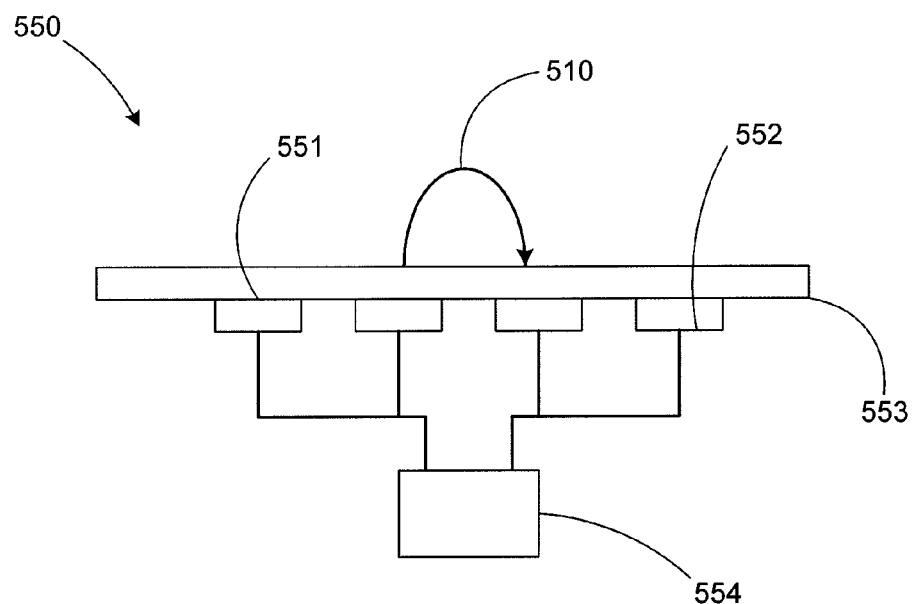
FIG. 5 illustrates schematically a cross sectional view through a touchscreen for detecting presence of a nearby object, according to one embodiment.

A three-dimensional sensing in a volume above the display 110 of a device 100 to detect gesture together with suitable user interface (UI) is illustrated in schematic of FIG. 5. The UI may be 3D as well and also be used together with a 3D display or a projector.

According to this embodiment an object, e.g. a user's finger is sensed in a 3D volume by using capacitive or electric field sensing. FIG. 5 illustrates a device 550 for capacitive and electric field sensing based on transmitting a signal 560 by means of one or several electrodes 551 and then receiving the response with another electrode(s) 552. The electrodes may be arranged behind a display layer 553 and controlled by a controller 554. If an object is close enough to the touch surface, a change in the capacitive coupling between the electrodes and the ground will be detected as the received signal strength will change.

According to the present invention the authentication is further enhanced by introducing a third dimension to the two-dimensional authentication code by adding 3D measurement, e.g. using pressure measurement or 3D sensing. In the following exemplary embodiments, the term changing level is used to indicate changing in the 3D code structure, i.e. in Z-axis direction, using pressure or distance change.

Figure 6:
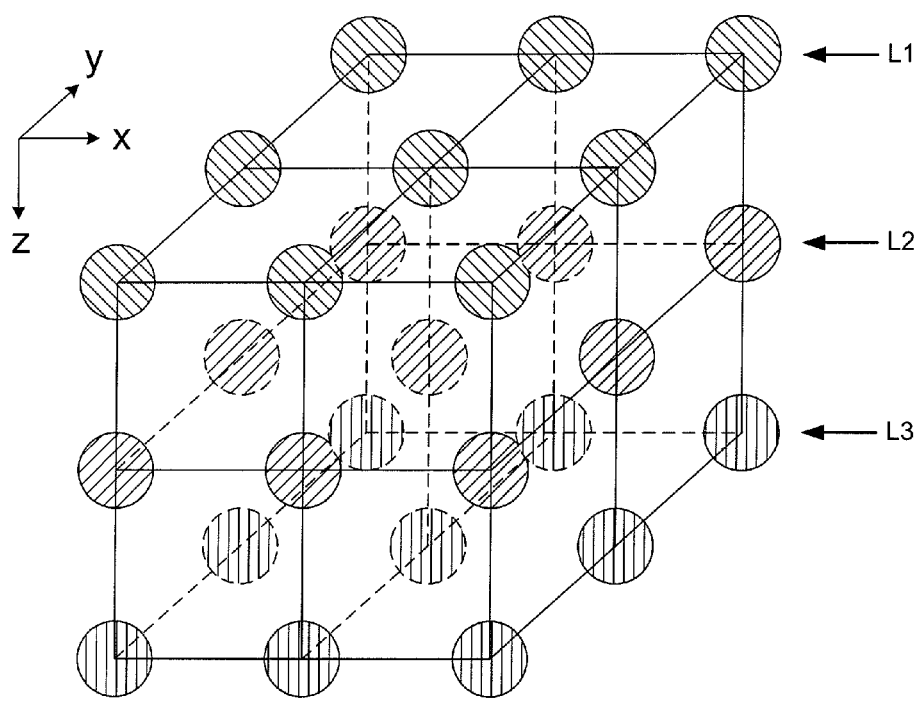
FIG. 6 illustrates schematically a three dimensional passcode according to one embodiment.

FIG. 6 illustrates a three dimensional dot structure, as an addition to the two dimensional structure illustrated on the screen of device 100 of FIG. 2. According to this example two additional (imaginary) levels L2 and L3 are added to the first level L1, which is displayed. Clearly, the number of dots and levels may vary depending on authentication strength and/or application.

Figure 7:
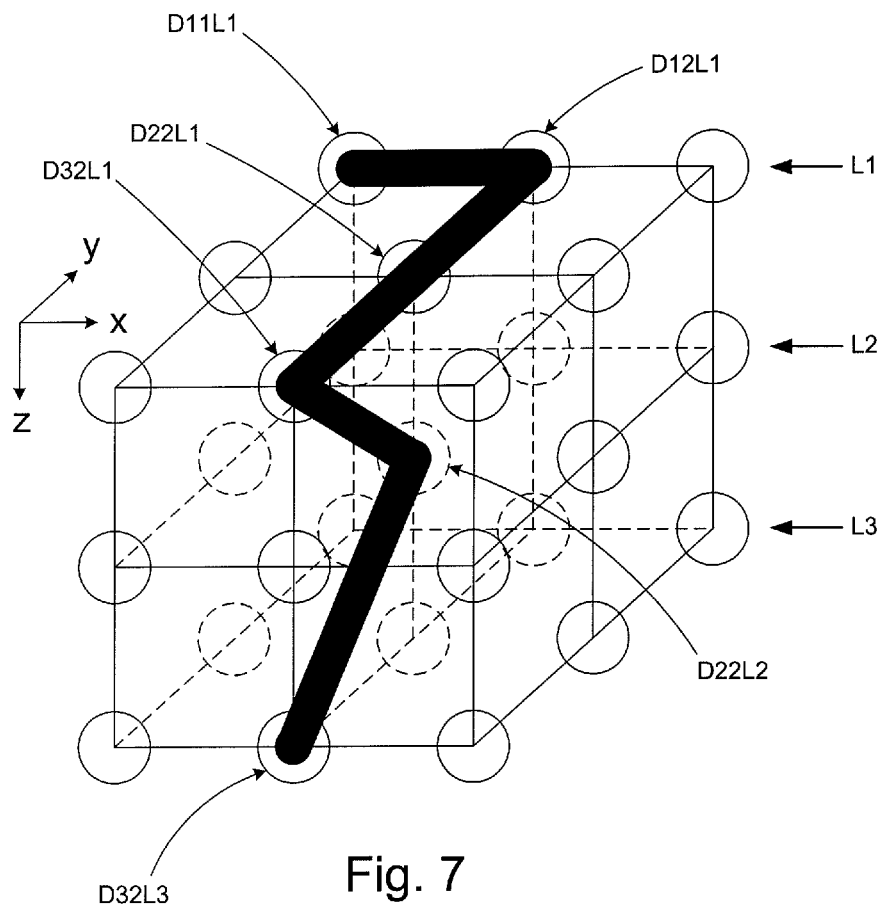
FIG. 7 illustrates schematically the three dimensional passcode according to FIG. 6 with a passcode.

L2 and L3 are actuated by pressing the finger or stylus with different pressures on the screen or holding the finger/stylus a predetermined distance from the surface when moving between the dots. FIG. 7 illustrates a graphical authentication code generated in this way. For example, starting from D11L1, the finger is moved to D12L1, D22 L1 and D32L1. Moving back towards D22 L1 a harder pressure is applied or moving away/closer to the surface, which is sensed by the touchscreen and L2 is activated and D22L2 is put in the graphical authentication code. Again moving towards D22L2 level is changed and L3 is activated. The graphical code is stopped at D22L3.

X-axis and Y-axis relate to movement on the surface in the surface plane of the touchscreen and Z-axis relates to pressure or distance change by finger/stylus on the touchscreen.

The graphical code is interpreted by the processor as described earlier.

Obviously, the pressure application may be reversed, i.e. the increased pressure may change level instead of decreased pressure. Same applies to distance change, moving closer may change level down and away from the surface may change level up, and vice versa.

Moreover, the passcode may only be generated in the z-axis.

The authentication code may be preprogramed or "taught" the device during a training session.

To facilitate and visualise for the user, the dots (or other marking means) may change colour or be marked-up when changing level. The screen may also change background colour to indicate level change. The entire three dimensional dot structure may be displayed and the graphical code may be displayed in three dimensions when entering the code.

Figure 8:
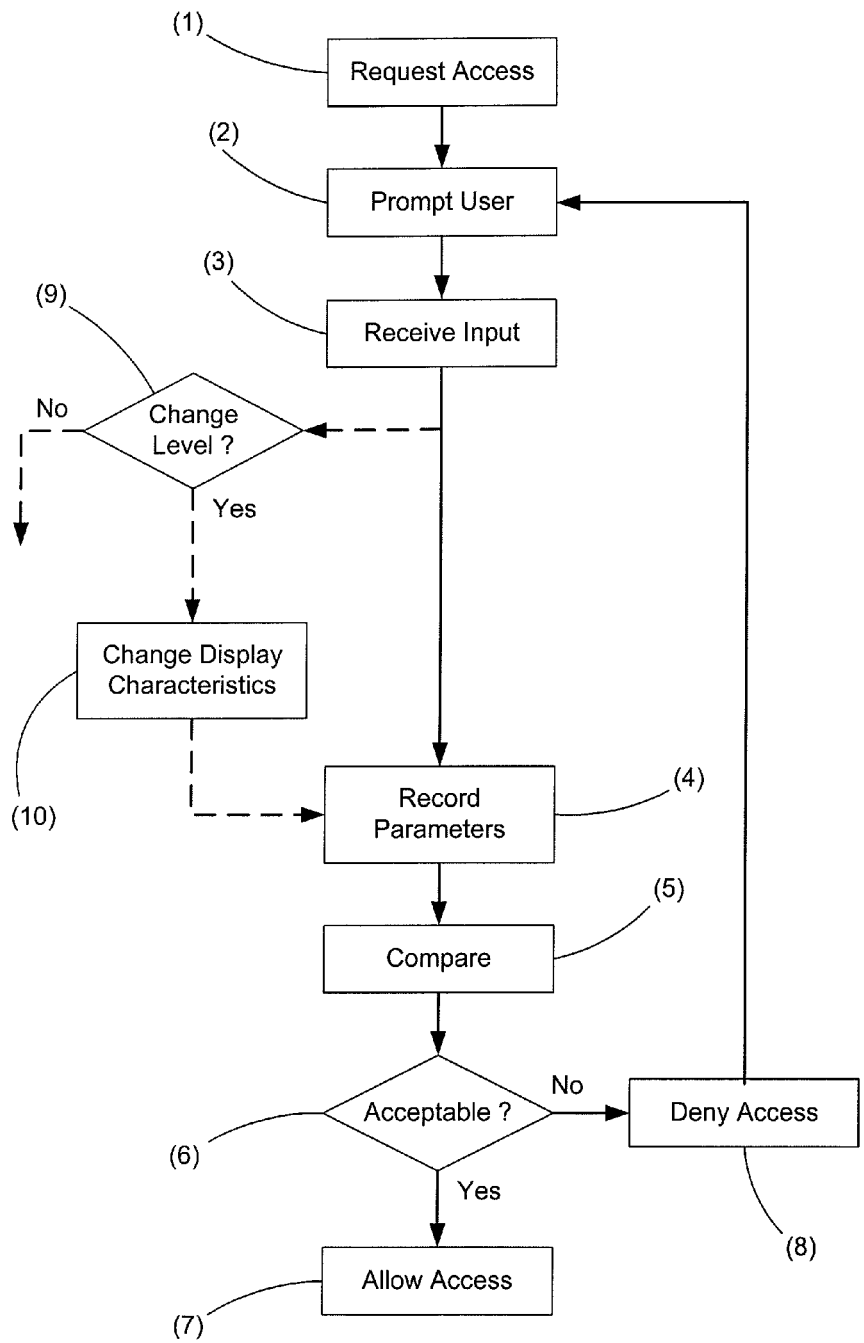
FIG. 8 is a process flow diagram of an embodiment method for desired graphical authentication code.

FIG. 8 illustrates the method steps of an embodiment according to the invention. In the illustrated embodiment, a user requests (1) access to the, device e.g. cell phone 100 of FIG. 1 that uses a graphical authentication system of the present invention. The cell phone via the processor 101 and display 110 prompts (2) the user to input a graphical authentication code used as an authentication credential. The user inputs the graphical code which is received (3) by the processor 101 via the touch surface and interface module 105. As the passcode is sketched out on the surface, the processor may measure a number of characteristic parameters, i.e. pressure and/or distance and X or Y coordinate data via module 105 of the inputted graphical code. The code may be stored (4) in the memory buffer. Once the measured parameters values are stored in a buffer, a passcode template, stored previously during a training session, along with the various acceptable parameter values for each of the different parameters for the passcode template may be retrieved from the memory. Each of the measured parameter values for the inputted passcode is compared (5) against the respective retrieved parameter of the passcode template and it is determined as to whether the inputted passcode falls within acceptable ranges of the passcode template. If (6) each of the respective measured parameter values stored in the buffer is within the range of acceptable values of each respective stored parameter then access to the cell phone 100 is allowed (7). If any of measured parameter values is not within the range of acceptable values of the passcode template, then access to the cell phone is not denied (8). If access to the cell phone 100 is denied, the user may optionally be promoted to re-input the passcode and to repeat steps (2)-(7).

Pressure/distance measurement and three dimensional passcode may be an optional feature and set during the training session.

According to optional steps (9) and (10) the display may change characteristics to facilitate for the user to see the inputted code. In step (9) if pressure/distance change is sensed (change level), another level for the code is displayed, display colour is changed, three dimensional structure is visualised, etc.

The various parameters of the passcode may be stored in the device locally or in the network. Also, the comparison may be executed in the device locally or in a controller of the network.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What we claim is:

1. A method of evaluating an access-code for providing access to a device, the method comprising:
   receiving via a touch surface of said device a graphical code comprising at least two portions, a first portion in a first plane comprising x- and y- axes relative to said first plane and corresponding to a first physical value on said touch surface and a second portion in a second plane comprising a z-axis relative to said first plane and corresponding to a second physical value on said touch surface, and
   generating a three dimensional graphical security code based on said first and second physical values.

2. The method of claim 1, wherein said physical value is a pressure value on said touch surface.

3. The method of claim 1, wherein said physical value is a distance value from said touch surface.

4. The method according to claim 1, wherein said first physical value generates said graphical code in x and y directions on said touch surface and said second physical value extends said graphical code in a z-direction, wherein x, y and z directions are in Cartesian coordinates.

5. The method according to claim 1, comprising generating a guiding image on said touch surface, illustrating said graph in a first or second level with respect to said first and second values.

6. The method of claim 5, wherein said guiding image changes characteristics with respect to said first and second physical values.

7. The device according to claim 6, comprising an interface unit configured to change guiding image characteristics with respect to said first and second physical values.

8. The method according to claim 1, the method carried out in a device or a network in communication with said device.

9. A device comprising: a processor, a touch surface connected to said processor, said touch surface being configured to detect a physical quantity with respect to a pointing object and provide said processor with a signal relating to said physical quantity, wherein the processor is configured to receive said signal, detect if said physical quantity comprises a first or a second value, generate a three dimensional graphical security code based on said first and second signal, said graphical security code having one portion comprising a first plane having x- and y- axes relative to said touch surface and a second portion having a z-axis relative to said touch surface.

10. The device of claim 9, comprising a pressure sensitive touch surface having a pressure value on said touch surface.

11. The device of claim 9, comprising a touch surface-measuring distance to an object.

12. The device according to claim 9, wherein said first physical value generates said graphical code in x and y directions on said touch surface and said second physical value extends said graphical code in a z-direction, wherein x, y and z directions are in Cartesian coordinates.

13. The device according to claim 9, comprising an interface unit for generating a guiding image on said touch surface, illustrating said graph in a first or second level with respect to said first and second values.

14. The device according to claim 9, wherein said device is at least one of a cellular telephone, personal data assistants (PDA's), palm-top computers, wireless electronic receivers and cellular telephone receivers, multimedia Internet enabled cellular telephones, and similar personal electronic devices.

15. A non-transitory computer readable medium for providing access to a device, comprising:
   an instruction set for receiving via a touch surface a touch pattern comprising a three dimensional graphical security code, said code comprising at least two portions, a first portion in a first plane comprising x- and y-axes relative to said first plane and relating to a first physical value on said touch surface and a second portion in a second plane comprising a z-axis relative to said first plane and relating to a second physical value on said touch surface, and an instruction set for generating a graphical security code based on said first and second physical values.

* * * * *